April 20, 1948. E. N. SNYDER 2,439,873
COMBINED BIRD CAGE PERCH CLEANER AND HOLDER FOR MITE ATTRACTING MATERIAL
Filed Oct. 12, 1944

Inventor
Ellis N. Snyder
By: Hice & Hice Attys.

Witness:
V. Siljander

Patented Apr. 20, 1948

2,439,873

UNITED STATES PATENT OFFICE 2,439,873

COMBINED BIRD CAGE PERCH CLEANER AND HOLDER FOR MITE ATTRACTING MATERIAL

Ellis Norman Snyder, Melrose Park, Ill.

Application October 12, 1944, Serial No. 558,304

3 Claims. (Cl. 119—22)

This invention relates to a combined bird cage perch cleaner and holder for mite attracting material and its principal object is to provide a simple and inexpensive implement having means thereon at one end whereby to scrape the bottom of a bird cage, and having an arched inwardly roughened portion intermediate its ends, whereby the perches in the bird cage may be cleaned and roughened, and having also hook members at one end whereby the device may be suspended on a bird cage with a bunch of white cotton contained in the arched portion and serving to attract mite from the bird.

The invention contemplates a bird cage cleaner which may be constructed of sheet metal struck up with suitable dies to give it its shape and contour.

With these and other objects and advantages in view this invention consists in the several novel features hereinafter fully set forth and claimed.

The invention is clearly illustrated in the drawing accompanying this specification, in which.

Figure 1:
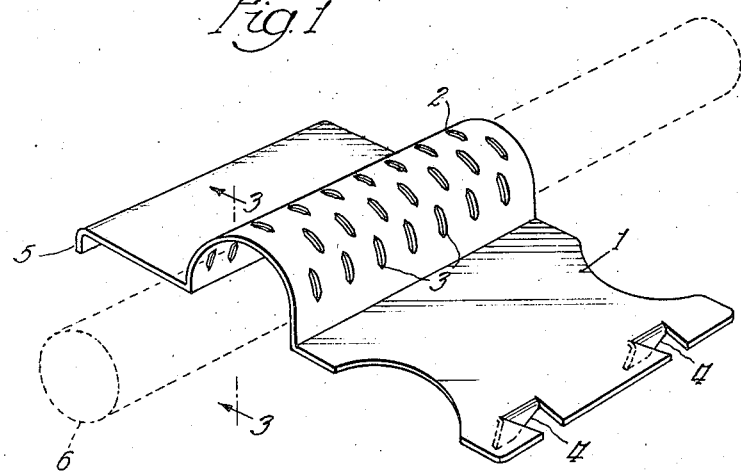
Fig. 1 is a perspective view of a bird cage cleaner illustrating a simple embodiment of the present invention.

Referring to said drawing the reference character 1 designates a substantially rectangular piece of molded plastic material or sheet metal piece, struck up with suitable dies to give it its shape and contour. In the main, said piece is flat, and approximately midway between the ends, the plastic or metal sheet is bowed or arched upwardly in a transverse direction to provide an arch 2 which is provided with a multiplicity of inwardly projecting indentations 3 to provide a roughened internal face, for cleaning and roughening a bird perch such as is illustrated at 6.

The far edge of the device is bent down to form a flange 5 which serves as a scraper for scraping the bottom of a bird cage. On the opposite end of the device, tongues 4 are formed and bent down to provide hooks, whereby the device may be suspended on the outside of the bird cage. Conveniently, the side edges of one of the flat portions of the device are curved inwardly to enable a person to more easily grasp the device when manipulating it as a scraper.

To use the device for cleaning the bottom of a bird cage, the device is grasped at the flat part using the same as a handle, and the edge of the flange is drawn along the bird cage bottom thereby scraping off the collected matter.

To use the device as a bird perch cleaner, the arched portion is placed over the perch, and moved back and forth thereon along its top, bottom and sides, thus cleaning the perch and also roughening it so that the bird may more readily cling to it.

Figure 2:
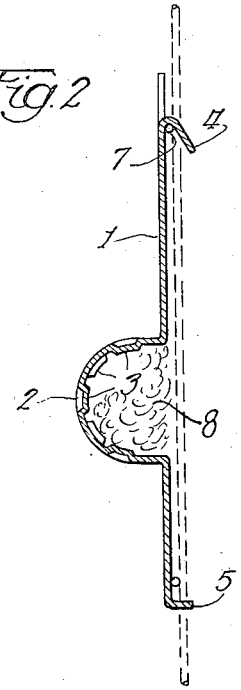
Fig. 2 is a vertical longitudinal section through the device and showing the same suspended upon a bird cage with cotton in the arched portion.
Figure 3:
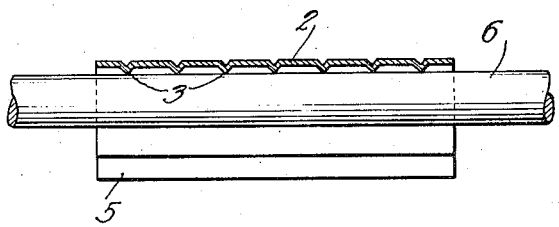
Fig. 3 is a cross section taken on the line 3—3 of Fig. 1.

To use the device as a trap for catching mite, white cotton 8 is stuffed into the hollow of the arched portion and the device is suspended on the outer side of the bird cage from one of the horizontal wires 7 thereof with the white cotton held between the wall of the arched portion of the device and the wire wall of the bird cage as shown in Fig. 2. It is well known that material of a white color attracts mite. The device may be removed from the bird cage as frequently as is required to dispose of the cotton.

From the above it is apparent that I have provided an implement capable of many uses, one that is simple, inexpensive and fulfills a long felt want.

Having thus described my invention, it is obvious that various immaterial modifications may be made in the same without departing from the spirit of my invention; hence, I do not wish to be understood as limiting myself to the exact form, construction, arrangement, and combination of parts herein shown and described or uses mentioned.

What I claim as new and desire to secure by Letters Patent is:

1. A combined bird cage perch cleaner and holder for mite attracting material comprising a substantially rectangular piece of stiff metal, said piece being arched upwardly intermediate its ends with the arch extending transversely of the device, said arched portion having indentations extending inwardly and providing a roughened perch cleaning face, and hook members extending from an edge of the piece whereby the device may be suspended upon a bird cage with mite attracting material contained in the arched portion.

2. A combined bird cage perch cleaner and holder for mite attracting material comprising a substantially rectangular piece of stiff metal, having an arched transversely extending perch cleaning portion between the ends having indentations therein and a hook on one end whereby to suspend the device on a bird cage with mite attracting material contained in the arched portion.

3. A combined bird cage perch cleaner and holder for mite attracting material comprising a substantially rectangular piece of sheet metal flat throughout its major portion and provided intermediate its ends with an arched transversely extending perch cleaner portion having indentations therein, said piece having hooks struck up from one end for suspending the device on a bird cage with mite attracting material contained in the arched portion.

ELLIS NORMAN SNYDER.

REFERENCES CITED

The following references are of record in the file of this patent:

UNITED STATES PATENTS

| Number | Name | Date |
| --- | --- | --- |
| 1,489,071 | Fairfield | Apr. 1, 1924 |
| 1,497,165 | Bottomley | June 10, 1924 |
| 1,708,346 | Worrell et al. | Apr. 9, 1929 |
| 1,759,739 | Ferris | May 20, 1930 |
| 1,980,754 | Henning et al. | Nov. 13, 1934 |
| 2,174,481 | Rosenfelder | Sept. 26, 1939 |
| 2,207,286 | Cohen | July 9, 1940 |
| 2,264,939 | Hawkins | Dec. 2, 1941 |
| 2,297,566 | Laux | Sept. 29, 1942 |

FOREIGN PATENTS

| Number | Country | Date |
| --- | --- | --- |
| 10,772 | Great Britain | May 7, 1912 |
| 17,449 | Great Britain | 1890 |